INVENTORS.
JOHN MALET CHAMBERS &
JAMES CURTIS McNEICE
BY
Carlson, Pitzner, Hubbard & Wolfe
ATTORNEYS.

May 1, 1956 J. M. CHAMBERS ET AL 2,743,934
TANK SUPPORT STRUCTURE FOR USE ON TRACTORS OR THE LIKE
Filed Dec. 4, 1953 3 Sheets-Sheet 3

INVENTORS.
JOHN MALET CHAMBERS &
JAMES CURTIS McNEICE
BY
Carlson, Pitzner, Hubbard & Wolfe
ATTORNEYS.

United States Patent Office 2,743,934
Patented May 1, 1956

2,743,934

TANK SUPPORT STRUCTURE FOR USE ON TRACTORS OR THE LIKE

John Malet Chambers, Blackdown Hill, Leamington Spa, and James Curtis McNeice, Lillington, Leamington Spa, England, assignors to Massey-Harris-Ferguson (Sales) Limited, a British company Application December 4, 1953, Serial No. 396,161

5 Claims. (Cl. 280—5)

The present invention relates to support structures for use on tractors or the like and, more particularly, to structures adapted for removable mounting on a tractor and capable of supporting auxiliary equipment such as insecticide tanks.

The general aim of the invention is to mount auxiliary equipment, such for example as insecticide tanks, on a tractor in a simple and convenient manner.

More particularly, it is an object of the invention to provide a supporting structure which has the attributes that (a) it may be detachably secured to some convenient mounting point on the tractor, desirably the rear axle housing, (b) it will locate the carried device or load remote from the attachment point and where required for most convenient use, as for example, midway of the length of the tractor, and (c) it will not require the heavy, unwieldy structural elements that would be required, for example, in simply a rigid cantilever beam bolted to the axle housing to protrude from it.

In a more specific aspect, it is an object of the invention to provide for the support of auxiliary tanks or the like in the location of "saddle bags," so to speak, on a tractor, i. e., disposed substantially midway along either side of the tractor, through the employment of a novel support structure mounted solely upon the rear axle housings of the tractor.

Still another object is to provide such a support structure which is simple, economical, and light in weight, yet capable of supporting relatively heavy auxiliary equipment by virtue of its unique organization placing its principal elements in tension or compression and leaving them free of bending moments or stresses.

Additional objects and advantages will become apparent as the following description proceeds, taken in conjunction with the accompanying drawings, in which.

While the invention has been shown and is described in some detail with reference to a particular embodiment thereof, there is no intention that it thus be limited to such detail. On the contrary, it is intended here to cover all alternative constructions, modifications, and equivalents falling within the spirit and scope of the invention as defined by the appended claims.

Figure 1:
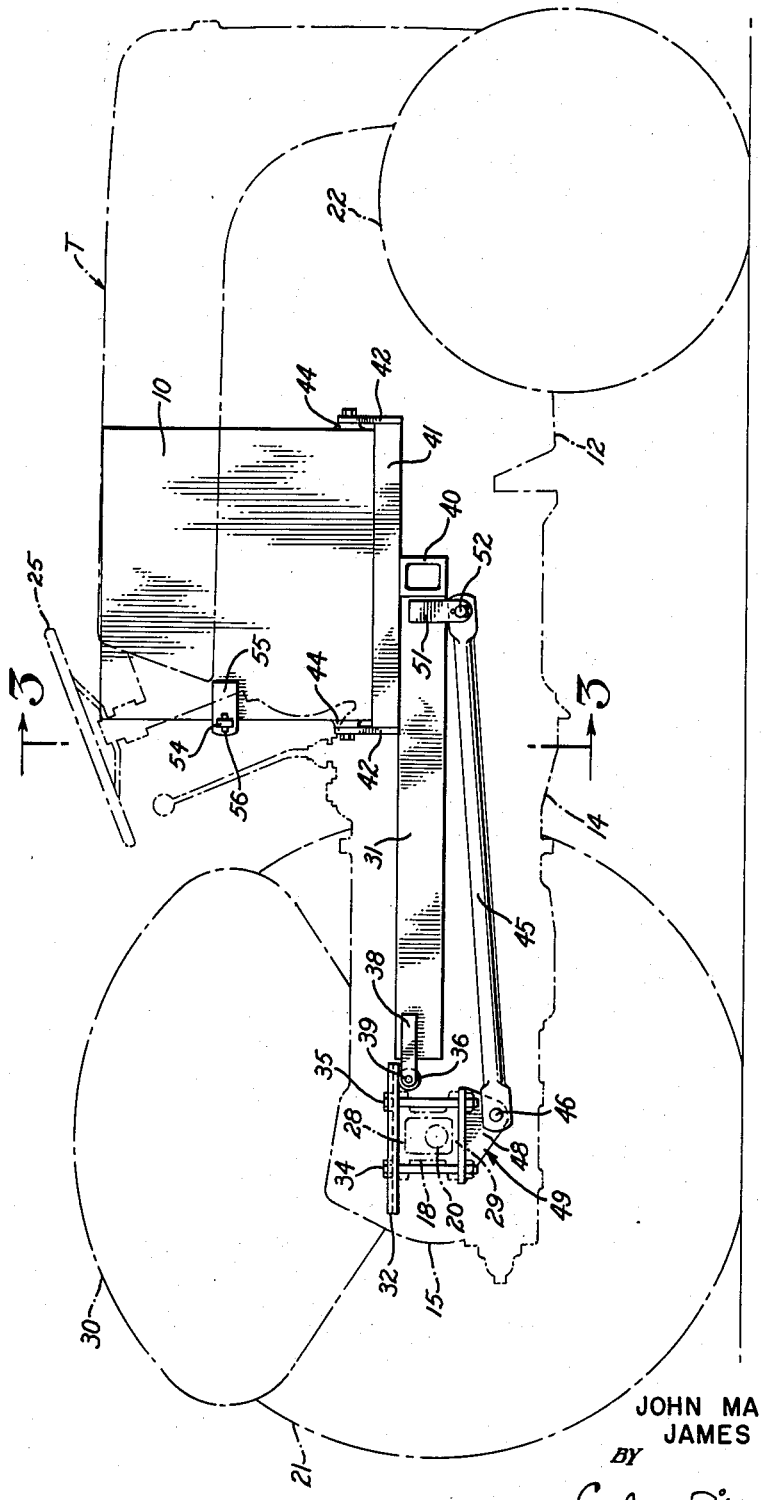
Figure 1 is a side elevation of a support structure embodying the invention and illustrated as applied on a tractor, one rear wheel of the latter being omitted for clarity.
Figure 2:
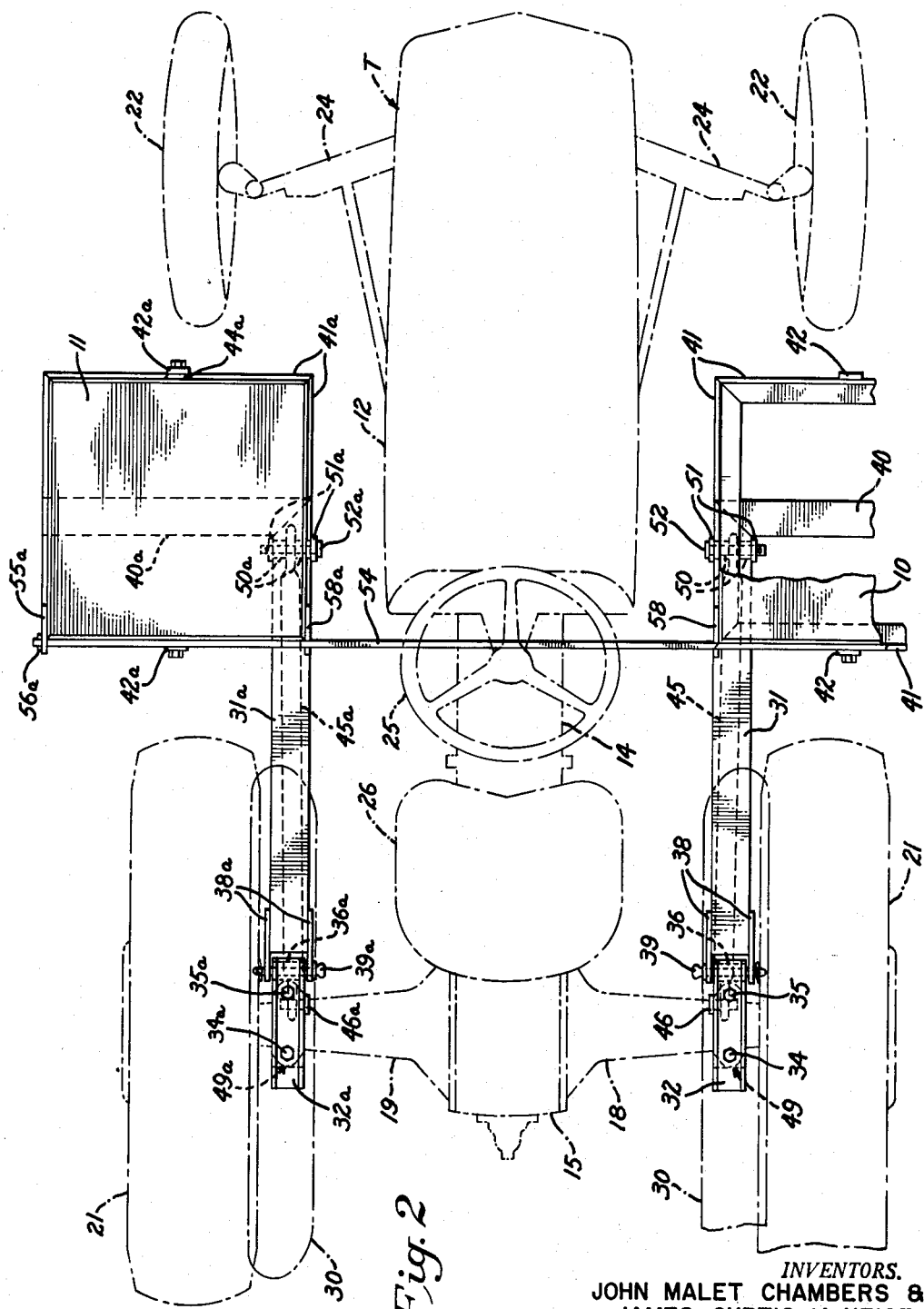
Fig. 2 is a plan view of the support structure and tractor shown in Fig. 1.
Figure 3:
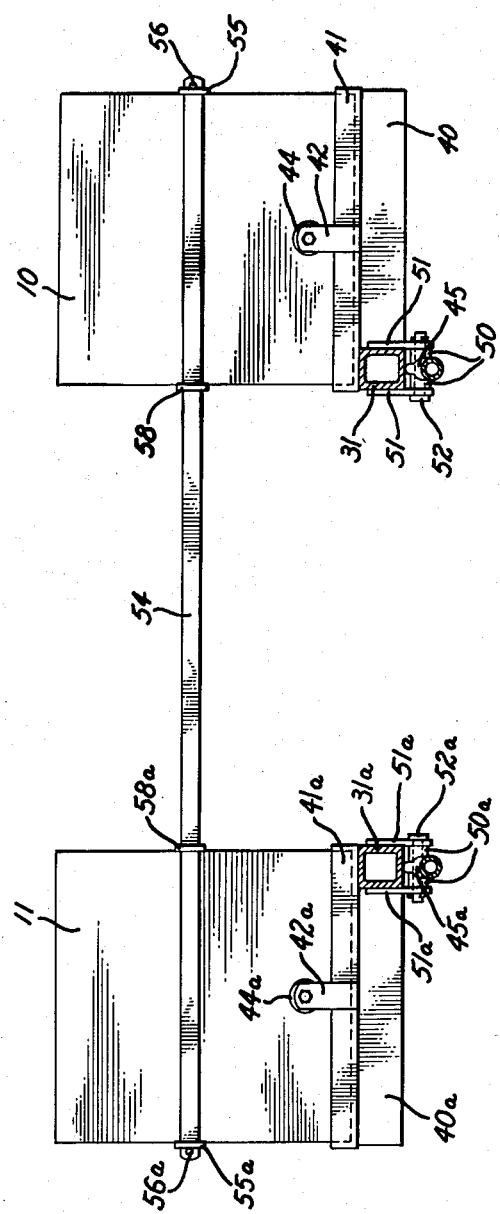
Fig. 3 is a rear elevation of the support structure, partially in section, taken substantially along the line 3—3 in Fig. 1.

Referring now to the exemplary embodiment of the invention here shown, a support structure has been illustrated (Figs. 1 and 2) as mounted on the rear axle housings of a tractor T and as supporting auxiliary equipment, here shown as a pair of insecticide tanks 10, 11 disposed midway along either side of the tractor.

The tractor T may take any one of a variety of forms. That shown here will be recognized by those skilled in the art as the familiar "Ferguson" tractor. It includes a forward engine section 12 connected through a transmission housing 14 with a center housing 15 for differential gears. Axle housings 18, 19 extend in opposite transverse directions from the center housing 15, protectively surrounding live rear axles 20 which drive large rear traction wheels 21. For maneuvering the tractor, steerable front wheels 22 are mounted on extensible axle assemblies 24 and connected with a steering wheel 25 located just forward of a driver's seat 26. The axle assemblies 24 are adapted to provide for adjustments in length, thereby affording variations in the tread or spacing between the front wheels 22.

The "Ferguson" tractor T illustrated in the present instance has existing upper and lower flats 28, 29 formed near the outer ends of the axle housings 18, 19. These flats are provided for a variety of purposes, one being the removable bolting of a mating flange on mudguards 30 which are carried above the rear wheels 21 in a well-known manner.

The insecticide tanks 10 and 11, shown in this instance as the auxiliary equipment to be supported from the tractor, may be formed of sheet metal generally in the shape of a cube. Such auxiliary tanks may be employed to store an extra supply of insecticide or the like when the tractor is operated in connection with a spraying outfit. Usually a main tank is carried by an implement hitch (not shown) at the rear of the tractor. It is to be understood, however, that the present invention is applicable in supporting any of a wide variety of auxiliary objects or equipment other than the illustrated tanks.

The problem encountered in attempting to mount such auxiliary equipment is that sufficient room is not available for items, such as the tanks 10 and 11, at points where a support for them may be easily attached to the tractor. The rear wheels 21 and mudguards 30 prevent mounting the tanks directly over the rear axle housings, and in such location, the tanks might interfere with the freedom of the driver or with other equipment attached to the rear of the tractor. On the other hand, the front axle assemblies 24 do not present a good mounting location since room is limited and the tanks might interfere with steering or the convenient adjustment in front wheel tread width. Finally, there is no convenient point midway along the tractor's transmission housing 14 for attaching a mounting structure which will hold the tanks sufficiently elevated to be free of undergrowth or other obstructions as the tractor advances.

In accordance with the invention, the present support structure provides an effective solution to this problem by holding the tanks in "saddled" relation substantially midway along either side of the tractor, but through the attachment of the support structure solely at an aft location on the tractor, e. g., at the preexisting flats 28, 29 on the axle housings 18, 19. The support structure comprises one or more assemblies each having two arms pivotally connected with the tractor and each other in triangular configuration, such that the weight of a tank places one arm in tension and the other in compression, leaving them free of bending moments or stresses.

As here shown, the support structure comprises two substantially identical pivotally connected trianglar assemblies disposed on opposite sides of the tractor T. These assemblies include elongated tubular arms 31 and 31a, which may be rectangular in cross section, extending alongside the tractor T and adapted at their aft ends for pivotal connection to the upper flats 28 of the corresponding axle housings 18 and 19. For this latter purpose, flat plates 32 and 32a are bolted to the upper flats 28 on each of the axle housings by the same bolts 34, 35 and 34a, 35a which are normally employed for securing the mudguards 30 to such flats. If desired, the cooperating flanges on the mudguards may be superimposed on the plates 32 and fastened by the bolts as before. On the underside of the forward ends of the plates 32, 32a, tubular eyes 36 and 36a are fastened, as by welding. For pivotally connecting the arms 31 and 31a, each is provided with spaced apertured straps 38 and 38a which embrace the eyes 36 and 36a and receive connecting pins 39 and 39a inserted through them and locked by any means such as a cotter pin.

The arms 31 and 31a extend forwardly substantially to the midportion of the tractor T and are L-shaped, i. e., terminated by outwardly-turned transverse portions 40 and 40a. For supporting the tanks 10 and 11, socket-like frames or platforms are fastened on the upper sides of the forward portions of the arms 31 and 31a. The frames may be of rectangular configuration formed by four welded angle iron pieces 41 and 41a suitably welded together and fastened, as by welding, to the arms 31, 31a with the transverse portions 40, 40a extending beneath the midportion of the frames, as illustrated. To lock each tank in its corresponding frame, upstanding apertured lugs 42, 42a may be welded to the front and rear angle pieces 41, 41a for receiving bolts threaded into cooperating tapped bosses 44, 44a properly located on the tanks.

To maintain the arms 31, 31a in their horizontal positions, a second pair of arms or struts 45, 45a are pivotally connected between the forward portions of the corresponding arms 31, 31a and the underside of the axle housings 18, 19. The aft ends of the arms 31, 31a and the struts 45, 45a are thus vertically spaced, with the struts converging toward the arms in a forward direction. As here shown, the tubular struts 45, 45a are circular in cross section and flattened and apertured at either end. At their aft ends, the struts 45, 45a are held by pivot pins 46, 46a inserted through depending lug portions 48, 48a on axle brackets 49, 49a bolted to the undersides of the angle housings by the same bolts 34, 35 and 34a, 35a which hold the upper plates 32, 32a. The forward ends of the struts 45, 45a are pivotally received on spacing sleeves 50, 50a which are inserted between spaced, apertured straps 51, 51a depending from the forward portions of the arms 31 and 31a. Pins 52, 52a inserted through the sleeves 50, 50a and straps 51, 51a complete the pivotal connections.

It will be apparent from the foregoing that since the weight of the tanks 10 and 11 and their contents is taken by tension in the arms 31, 31a and compression in the struts 45, 45a, these long members may be relatively light in weight and thin in cross section. No bending stresses are set up which tend to deflect or distort the arms 31, 31a and struts 45, 45a.

The two pin-connected triangular assemblies thus far described would support the tanks 10 and 11 well enough under ordinary conditions. However, if the tanks are unduly heavy, they may tend to twist the arms 31, 31a and struts 45, 45a since their centers of gravity are located outside the longitudinal axes of the latter members. Additionally, as the tractor T traverses rough terrain there may be a tendency for the tanks 10, 11 to splay outwardly, thus tending to bend the arms 31, 31a and struts 45, 45a in a horizontal plane, or perhaps placing undue stress on the pivot pins 39, 46 and 52, and 39a, 46a and 52a.

In accordance with another feature of the invention, means are provided for bracing the support structure against both such tendencies. In the present instance, a cross bar 54 is connected between the two tanks 10 and 11. For such connection, slotted straps 55, 55a are welded to the outer faces of the tanks 10 and 11 at points considerably above the bottoms of the tanks and here shown substantially midway between the tops and bottoms of the tanks. The slots in the straps 55, 55a receive the opposite apertured ends of the cross bar 54, through which locking pins 56, 56a are then inserted. The tanks 10, 11 and the arms 31, 31a thus cannot spread transversely, nor can the latter be twisted about their longitudinal axes since such twisting would require axial spreading of the straps 55, 55a which is precluded by the cross bar 54 and locking pins 56, 56a. If desired, the connection between the tanks may be made still more rigid by openly slotted straps 58, 58a welded to the inner faces of the tanks in such position as to have the cross bar 54 lowered into the slots. The cross bar 54 prevents both the outward splaying of the tanks and triangular support assemblies as well as the twisting of the arms 31, 31a and struts 45, 45a due to the off-center location of the tanks' centers of gravity. However, the bar 54 may be relatively thin in cross section and light in weight since its bracing function is performed solely by tension placed in the bar, rather than bending moments.

From the foregoing, it will be apparent that the support structure described affords the convenient mounting of auxiliary equipment such as the tanks 10 and 11 at points spaced midway from a tractor where they cannot impair the operation of any parts of the tractor. Additionally, such support of the auxiliary equipment is accomplished by a simple, relatively light and removable structure which is attached to the tractor solely at existing flats on the rear axle housings. By virtue of the triangular configuration of the two support assemblies, and their pivotal connection at all points, the relatively long members employed take the weight of the auxiliary equipment by tension in the upper arms 31, 31a and compression in the lower struts 45, 45a with no bending moments or stresses being present. This indeed makes the support structure simpler and lighter than if a single cantilever member were rigidly attached to the axle housings and the weight of the forwardly located auxiliary equipment borne by bending stress in such cantilever member.

We claim as our invention:

1. For use with a tractor having laterally extending rear axle housings, the combination of a pair of auxiliary tanks for insecticide or the like with means for supporting said tanks substantially midway along opposite sides of the tractor, said supporting means including a pair of L-shaped arms adapted at their aft ends for pivotal connection to the upper side of respective ones of the axle housings with their shorter portions turned transversely outward from either side of the tractor, a pair of frames receiving said tanks and carried by respective ones of said arms on their shorter portions, a pair of struts adapted to be pivoted at their aft ends to the lower sides of respective ones of the axle housings and converging forwardly for pivotal connection with the forward portion of the corresponding arm, and a cross bar extending transversely of the tractor and connected at its opposite ends to said tanks to prevent splaying and twisting of said arms and struts, whereby said arms, struts and cross bar support said tanks by tension, compression and tension, respectively, and are free of bending stresses.

2. For use with a tractor having laterally extending rear axle housings; a support structure for holding auxiliary equipment along the sides of the tractor comprising, in combination, a pair of triangular, pivotally connected assemblies mounted on respective ones of the axle housings and extending forwardly along either side of the tractor; each of said assemblies including a top arm adapted to be pivoted at its aft end to the top of an axle housing and having an outwardly turned transverse portion at its forward end, a platform carried on said forward end of said arm and adapted to receive auxiliary equipment, and a strut adapted to be pivoted at its aft end to the bottom of the axle housing and extending in forwardly converging relation for pivotal connection to the forward portion of said arm; and a transverse cross bar adapted to be connected between the auxiliary equipment on each said platform to prevent splaying and twisting of the assemblies.

3. For use with a tractor having transversely extending rear axle housings, a removable support structure for auxiliary equipment comprising, in combination, a pair of arms adapted to be pivotally connected to the top surface of the respective axle housings and extending forwardly along opposite sides of the tractor, a pair of platforms carried at the forward portions of said arms and adapted to receive auxiliary equipment, and a pair of struts adapted at one end for pivotal connection to the undersides of respective ones of the axle housings and converging forwardly for pivotal connection to the forward portion of the corresponding arm, equipment placed on said platforms being thereby supported substantially midway along the sides of the tractor solely from the rear axle housings with said arms being in tension and said struts in compression.

4. In a tractor having a transversely extending rear axle housing provided with top and bottom flats near its outer end, a support structure for tanks or the like comprising, in combination, top and bottom brackets fixed to respective ones of the flats, a tubular arm pivotally connected to said top bracket and extending forwardly along the side of the tractor with an outwardly turned portion at its forward end substantially midway along the length of the tractor, a platform on the forward end of said arm adapted to receive a tank, a tubular strut pivotally connected at its aft end to said bottom bracket and at its forward end to the forward portion of said arm, said arm and strut thereby forming a triangular configuration with the axle housing and supporting the tank by tension in the arm and compression in the strut.

5. For use with a tractor having a transversely extending rear axle housing, a removable support structure for auxiliary equipment comprising, in combination, an arm and a strut, means for pivotally connecting the aft ends of said arm and strut to the top and bottom sides of the axle housing with the arm and strut extending forwardly along the side of the tractor, means for pivotally connecting said arm and strut together in the region of their forward ends, said arm and strut thereby converging forwardly and lying in triangular configuration with the axle housing, and means at the forward end of said arm for receiving auxiliary equipment, such equipment thereby being supported alongside the tractor without the creation of appreciable bending moments in said arm and strut.

References Cited in the file of this patent

UNITED STATES PATENTS

| | | |
|---|---|---|
| 818,217 | Anderson | Apr. 17, 1906 |
| 2,424,468 | Keathley | July 22, 1947 |
| 2,499,103 | Love | Feb. 28, 1950 |
| 2,560,570 | Harig | July 17, 1951 |
| 2,680,624 | Pool | June 8, 1954 |